United States Patent
Yu et al.

(10) Patent No.: US 11,181,873 B2
(45) Date of Patent: Nov. 23, 2021

(54) BAYESIAN ESTIMATION BASED PARAMETER ESTIMATION FOR COMPOSITE LOAD MODEL

(71) Applicants: Zhe Yu, San Jose, CA (US); Yishen Wang, San Jose, CA (US); Haifeng Li, Nanjing (CN); Chang Fu, San Jose, CA (US); Zhiwei Wang, San Jose, CA (US); Di Shi, San Jose, CA (US)

(72) Inventors: Zhe Yu, San Jose, CA (US); Yishen Wang, San Jose, CA (US); Haifeng Li, Nanjing (CN); Chang Fu, San Jose, CA (US); Zhiwei Wang, San Jose, CA (US); Di Shi, San Jose, CA (US)

(73) Assignee: GLOBAL ENERGY INTERCONNECTION RESEARCH INSTITUTE NORTH AMERICA (GEIRINA), San Jose, CA (US)

(*) Notice: Subject to any disclaimer, the term of this patent is extended or adjusted under 35 U.S.C. 154(b) by 143 days.

(21) Appl. No.: 16/704,920

(22) Filed: Dec. 5, 2019

(65) Prior Publication Data
US 2021/0173359 A1 Jun. 10, 2021

(51) Int. Cl.
G05B 13/04 (2006.01)
H02J 13/00 (2006.01)
H02J 3/28 (2006.01)

(52) U.S. Cl.
CPC ...... *G05B 13/048* (2013.01); *H02J 13/00002* (2020.01); *H02J 3/28* (2013.01)

(58) Field of Classification Search
CPC .... G05B 13/048; H02J 13/00002; H02J 3/28; Y02B 90/20; Y04S 20/00
See application file for complete search history.

(56) References Cited

U.S. PATENT DOCUMENTS

| | | | | |
|---|---|---|---|---|
| 9,829,880 B2* | 11/2017 | Baone | ................. | G05B 19/406 |
| 10,025,337 B2* | 7/2018 | Hancock | ............ | G01R 21/1331 |
| 10,095,820 B2* | 10/2018 | Drees | ..................... | G06F 30/20 |
| 10,429,807 B2* | 10/2019 | Eibsat et al. | ............ | G06F 30/13 |
| 10,770,897 B1* | 9/2020 | Hertz-Shargel | .......... | F24F 11/30 |
| 10,886,742 B2* | 1/2021 | Geinzer | ................... | H02J 11/00 |
| 2013/0090900 A1* | 4/2013 | Gering | ................. | G01R 31/392 703/2 |
| 2015/0066449 A1* | 3/2015 | Vittal | ...................... | G06F 30/20 703/2 |
| 2016/0147215 A1* | 5/2016 | Baone | ..................... | H02J 3/008 700/291 |

(Continued)

OTHER PUBLICATIONS

Bayesian Estimation Based Parameter Estimation for Composite Load; Google Scholar arxiv.org Fu C 2019 IEEE Power & Energy Society General Meeting (PESGM); Published 2019 (Year: 2019).*

(Continued)

*Primary Examiner* — Ramesh B Patel
(74) *Attorney, Agent, or Firm* — PowerPatent Inc.; Bao Tran

(57) ABSTRACT

A method for managing a power load of a grid includes performing a statistic-based distribution estimation of a composite load model using static and dynamic models with Gibbs sampling; deriving a distribution estimation of load model coefficients; and controlling grid power based on a simulation, a prediction, a stability analysis or a reliability analysis with the load model coefficients.

16 Claims, 9 Drawing Sheets

(56) References Cited

U.S. PATENT DOCUMENTS

2018/0059259 A1\* 3/2018 Carrel ..................... G01T 1/178
2020/0293331 A1\* 9/2020 Bernoudy ........... G06F 30/3308

OTHER PUBLICATIONS

Bayesian estimation based load modeling report; Google Scholar arxiv.org Fu C arXiv preprint arXiv:1810.07675; Published 2018 (Year: 2018).\*

Bayesian estimation on load model coefficients of ZIP and induction motor model; Google Scholar Li H Energies; Published 2019 (Year: 2019).\*

Geman, Stuart, and Donald Geman. "Stochastic relaxation, Gibbs distributions, and the Bayesian restoration of images." IEEE Transactions on pattern analysis and machine intelligence 6 (1984): 721-741.

D. P. Kingma and J. Ba, "Adam: A method for stochastic optimization," arXiv preprint arXiv:1412.6980, 2014.

Q. Liu, Y. Chen, and D. Duan, "The load modeling and parameters identification for voltage stability analysis," in Proceedings. International Conference on Power System Technology, 2002, vol. 4: IEEE, pp. 2030-2033.

A. Arabali, M. Ghofrani, M. Etezadi-Amoli, M. S. Fadali, and Y. Baghzouz, "Genetic-algorithm-based optimization approach for energy management," IEEE Transactions on Power Delivery, vol. 28, No. 1, pp. 162-170, 2012.

\* cited by examiner

| Para. | Real Value | Est. Value (mean) | Error(%) |
|---|---|---|---|
| $\alpha_1$ | 0.125 | 0.1248 | 0.16 |
| $\alpha_2$ | 0.125 | 0.128 | 6.7 |
| $\alpha_3$ | 0.25 | 0.256 | 2.4 |
| $\beta_1$ | 0.0048 | 0.00475 | 1.04 |
| $\beta_2$ | 0.0085 | 0.0083 | 2.33 |
| $\beta_3$ | 0.5 | 0.497 | 0.6 |
| $\alpha_b$ | 1.15 | 1.152 | 0.13 |
| $\alpha_c$ | 0.75 | 0.757 | 0.93 |

FIG. 9

| Para. | Est. Value with 10% Error | Est. Value with Anomalies |
|---|---|---|
| $\alpha_1$ | 0.1264 | 0.1267 |
| $\alpha_2$ | 0.1276 | 0.1268 |
| $\alpha_3$ | 0.254 | 0.2561 |
| $\beta_1$ | 0.0048 | 0.0046 |
| $\beta_2$ | 0.0081 | 0.00832 |
| $\beta_3$ | 0.52 | 0.46 |
| $\alpha_b$ | 1.3 | 1.24 |
| $\alpha_c$ | 0.78 | 0.734 |

FIG. 10

| Para. | GS | LS | GA |
|---|---|---|---|
| $\alpha_1$ | 0.1248 | 0.15 | 0.16 |
| $\alpha_2$ | 0.128 | 0.137 | 0.104 |
| $\alpha_3$ | 0.256 | 0.284 | 0.39 |
| $\beta_1$ | 0.00475 | 0.007 | 0.0072 |
| $\beta_2$ | 0.0083 | 0.0092 | 0.0102 |
| $\beta_3$ | 0.497 | 0.4 | 0.411 |
| $\alpha_b$ | 1.152 | 0.99 | 0.87 |
| $\alpha_c$ | 0.757 | 0.227 | 0.204 |

FIG. 11

| Para. | GS | LS | GA |
|---|---|---|---|
| $\alpha_1$ | 0.124 | 0.105 | 0.184 |
| $\alpha_2$ | 0.129 | 0.123 | 0.114 |
| $\alpha_3$ | 0.247 | 0.194 | 0.284 |
| $\beta_1$ | 0.0049 | 0.0047 | 0.0052 |
| $\beta_2$ | 0.00912 | 0.00154 | 0.008 |
| $\beta_3$ | 0.499 | 0.4009 | 0.45 |
| $\alpha_b$ | 1.144 | 0.9975 | 1.043 |
| $\alpha_c$ | 0.764 | 0.2043 | 0.442 |

FIG. 12

| Para. | GS | LS | GA |
|---|---|---|---|
| $\alpha_1$ | 0.124 | 0.122 | 0.199 |
| $\alpha_2$ | 0.129 | 0.117 | 0.107 |
| $\alpha_3$ | 0.247 | 0.228 | 0.297 |
| $\beta_1$ | 0.0049 | 0.0043 | 0.004 |
| $\beta_2$ | 0.00912 | 0.0084 | 0.006 |
| $\beta_3$ | 0.499 | 0.403 | 0.408 |
| $\alpha_b$ | 1.144 | 0.815 | 1.05 |
| $\alpha_c$ | 0.764 | 0.65 | 0.803 |

FIG. 13

BAYESIAN ESTIMATION BASED PARAMETER ESTIMATION FOR COMPOSITE LOAD MODEL

BACKGROUND

System load models can be categorized into two types, i.e., static model and dynamic model, based on different mathematical representation of the relationship between the power and the voltage. Conventional static models include ZIP model, exponential model, frequency dependent model, etc., and the induction motor (IM), exponential recovery load model (ERL) are the major dynamic load models used in research studies recently. Among different load models, the composite load under with ZIP+IM can be used with various conditions, locations and compositions. It has been widely used in industry applications and studied in voltage stability as well as planning, operation and control of power systems.

Load models are typically identified by component and measurement-based approaches. Component based approaches highly rely on characteristics of components and compositions of load, and consequently, the computational cost is higher than measurement approach, the accuracy of individual consumers is greatly affected by non-electric fac-tors such as data and weather. ZIP coefficients for widely used electrical appliances are determined by experiments, and the overall ZIP model was established with respect to the predetermined appliances. Difficulties in obtaining load composition information is another factor to be considered when implementing component-based identification approach. It is reported in some paper that to obtain consumption information of all electrical components in a power system is the most challenging task in such approach.

Measurement-based approaches, such as least-squares (LS) and genetic algorithm (GA), are another mainstream for load parameter identifications. Different techniques are reported to identify the parameters for composite load models. A robust time-varying load parameters identification approach proposed using batch-model regression in order to obtain the updated system parameters. One disadvantage of measurement-based approach is the dependence on data quality. Measurement anomalies and outliers may affect the robustness of estimation in both time-varying and time-independent load models. Moreover, these approaches only estimate the expected value of coefficients, and provide the point estimations of parameters, which may not be able to accommodate the characteristics of the ever-changing power system.

SUMMARY

In one aspect, a method for managing a power load of a grid includes performing a statistic-based distribution estimation of a composite load model using static and dynamic models with Gibbs sampling; deriving a distribution estimation of load model coefficients; and controlling grid power based on a simulation, a prediction, a stability analysis or a reliability analysis with the load model coefficients.

Advantages of the above method may include one or more of the following. Bayesian estimation (BE) based composite load parameter identification approaches can provide distributions of each parameter and overcome the disadvantages in traditional load modeling techniques. First, BE is a distribution estimation rather than point estimation technique, which provides the likelihood of each parameter. In this case, this method can provide accurate estimation of the parameters in both time constant and time-varying cases. Second, BE requires neither information of load compositions nor coefficients of appliances. The estimations rely on the observations or measurements, such as active power, reactive power, bus voltage, etc., as well as expert opinions. Third, BE is a robust estimation method due to its statistical characteristics: measurement anomalies and outliers will not significantly affect the results if the number of samples is large enough, and the effect of measurement error is also not significant either because the distribution interval contains the real value inside the distribution with expected probabilities. Last but not least, traditional BE based algorithm can be significantly impacted by its prior, therefore, an appropriate estimation of the prior is needed. In one embodiment, a gradient descent (GD) based algorithm is used to update the prior in each iteration. The prior can be settled to the real value within 10 steps in most cases and thus can provide a good estimation of the parameters in the composite load model. The system can better represent the attributes of the power system, especially the load, to provide more information for managing grid power. The system also provides a distribution estimation of load models coefficients and is robust to measurement errors.

BRIEF DESCRIPTIONS OF FIGURES

The following Figures are for illustration purposes only and are not drawn to scale. The exemplary embodiments, both as to organization and method of operation, may best be understood by reference to the detailed description which follows taken in conjunction with the accompanying drawings in which:

FIG. 9 shows estimated and real value of the parameters for ZIP+IM mode with 0 measurement error.

FIG. 10 shows estimated and real value of the parameters for ZIP+IM mode with 10% measurement error and anomalies.

FIG. 11 shows composite model parameter estimations without measurement error by different methods.

FIG. 12 shows composite model parameter estimation with different methods considering 10% measurement errors.

FIG. 13 shows composite model parameter estimation with different methods considering outliers.

DETAILED DESCRIPTION OF THE ILLUSTRATED EMBODIMENTS

Nomenclature $P_{ZIP}$, $Q_{ZIP}$: Real/reactive power measurement of a ZIP load $\alpha_1, \ldots, \alpha_6$: Coefficients to estimate in the ZIP model V: voltage magnitude at the load terminal $P_{ZIP0}$, $Q_{ZIP0}$, $V_0$: corresponding measurement of a ZIP load at the initial operating condition.

$\overline{V}=V/V_0$ $P_{IM}$, $Q_{IM}$: Real/reactive power measurement of an IM load $\hat{P}$, $\hat{Q}$: estimate of real/reactive power $\theta$: the coefficient vector to estimate $q(\theta)$: the prior distribution of the coefficients $R_S$: motor stator winding resistance $X_S$: motor stator leakage reactance $X_m$: motor magnetizing reactance $R_r$: rotor resistance $X_r$: rotor leakage reactance H: rotor inertia constant $\omega$: rotor speed $I_d$, $I_q$: stator current in d-axis and q-axis $U_d$, $U_q$: bus voltage in d-axis and q-axis $E_d'$, $E_q'$: stator voltage in d-axis and q-axis $T_0$: the initial load torque $X_r$, $X_m$, $X_s$, $R_r$, $R_T$, A, B, C, H: Coefficients to estimate in the IM model $(x, y) \triangleq \{(x_{ZIP}[1], y_{ZIP}[1]), \ldots, (x_{ZIP}[n], y_{ZIP}[n])\}$: time series measurement of the ZIP model $\mu, \mu_1, \mu_2, \mu_3, \mu_{\beta_1}, \mu_{\beta_2}, \mu_{\beta_3}, \mu_{\alpha_b}, \mu_{\alpha_c}$: mean of the corresponding distribution.

Figure 1:
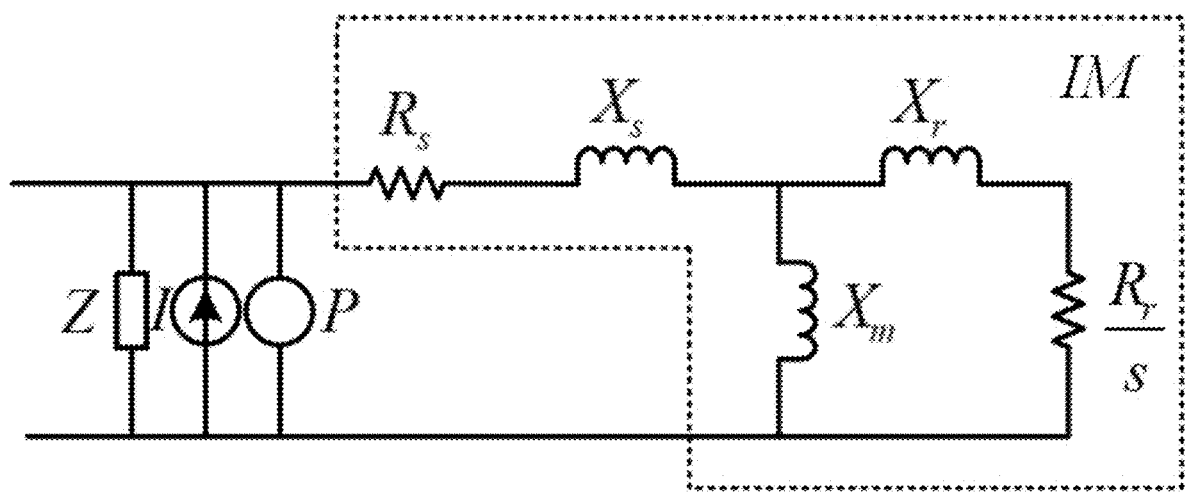
FIG. 1 shows an exemplary composite model of ZIP+IM.

$\tau, \tau_1, \tau_2, \tau_3, \tau_{\beta_1}, \tau_{\beta_2}, \tau_{\beta_3}, \tau_{\alpha_b}, \tau_{\alpha_c}, \tau_E, \tau_\omega, \tau_I$: reciprocal of the standard deviation of the corresponding distribution $\varepsilon[t], \varepsilon_{E_d}[t], \varepsilon_{E_q}[t], \varepsilon_\omega[t], \varepsilon_{I_d}[t], \varepsilon_{I_q}[t]$: noise of the corresponding model $\lambda_p$, $\lambda_q$: real/reactive power fraction of the ZIP model I. Approaches A composite load with ZIP+IM model is shown in FIG. 1, in which the ZIP model describes the steady-state behavior and the IM model corresponds to the dynamic process. The mathematical representations of the ZIP and IM model can be found in 1 and 2, respectively.

$$\begin{cases} P_{ZIP} = P_{ZIP0}(\alpha_1 \overline{V}^2 + \alpha_2 \overline{V} + \alpha_3), \\ Q_{ZIP} = Q_{ZIP0}(\alpha_4 \overline{V}^2 + \alpha_5 \overline{V} + \alpha_6), \end{cases} \quad (1)$$

$$\begin{cases} \dfrac{dE_d'}{dt} = -\dfrac{1}{T'}[E_d' + (X-X')I_q] - (\omega - 1)E_q' \\ \dfrac{dE_q'}{dt} = -\dfrac{1}{T'}[E_q'(X-X')I_d] + (\omega - 1)E_d' \\ \dfrac{d\omega}{dt} = -\dfrac{1}{2H}[(A\omega^2 + B\omega + C)T_0 - (E_d' I_d + E_q' I_q)] \end{cases} \quad (2)$$

$$\begin{cases} I_d = \dfrac{1}{(R_s^2 + X'^2)}[R_s(U_d - E_d') + X'(U_q - E_q')] \\ I_q = \dfrac{1}{(R_s^2 + X'^2)}[R_s(U_q - E_q') - X'(U_d - E_d')] \end{cases}$$

The parameters need to be identified in this composite model are $\alpha_1, \ldots \alpha_6$, $X_m$, $X_r$, $X_s$, $R_r$, A, B, C, H. Some notations in equations (1) and (2) are defined as follows:

$X' \triangleq X_s + X_m X_r / (X_m + X_r)$, $X \triangleq X_s + X_m$, $T' \triangleq (X_r + X_m)/R_r$ \quad (3)

A. ZIP Model

The ZIP model describes how the power of load changes as voltage varies in the steady-state condition. The ZIP model is formulated as follows.

$$P_{ZIP} = P_{ZIP0}(\alpha_1 \overline{V}^2 + \alpha_2 \overline{V} + \alpha_3) \quad (4)$$

$$Q_{ZIP} = Q_{ZIP0}(\alpha_4 \overline{V}^2 + \alpha_5 \overline{V} + \alpha_6)$$

$$\sum_{i=1}^{3} \alpha_i = \sum_{i=4}^{6} \alpha_i = 1$$

where $\Sigma_{i=1}^3 \alpha_i = \lambda_p$, $\Sigma_{i=4}^6 \alpha_i = \lambda_q$, $\overline{V}=V/V_0$. When voltage V deviates from $V_0$, real and reactive power of the load is assumed to follow a quadratic model. As the real power and reactive power follow the same form of model, we will discuss only the real power as an example in the following. The reactive power follows the same procedure.

One implementation defines $y_{ZIP}[t]=P_{ZIP}[t]/P_{ZIP0}$, $x_{ZIP}[t]=V[t]/V_0$, where $P_{ZIP}[t]$ and $V[t]$ are the $t^{th}$ measurements of the real power and voltage magnitude of the ZIP load. The following assumptions are made.

The measurement noise follows a normal distribution, i.e., $y_{ZIP}[t]=\alpha_1 x_{ZIP}[t]^2+\alpha_2 x_{ZIP}[t]+\alpha_3+\varepsilon[t]$, where $\varepsilon[t] \sim \mathcal{N}(0, 1/\tau)$, and $1/\tau$ is the variance. The reasons for making this assumption are: 1) According to the law of large numbers, a normal distribution would be the best one to represent the characteristics of the noise if the number of experiments is large enough. 2) Since normal distribution is a conjugate distribution, it is easier for model parameter updating when implementing Gibbs sampling.

Total number of n independent and identically distributed (i.i.d.) samples were drawn, namely $(x, y) \triangleq \{(x_{ZIP}[1], y_{ZIP}[1]), \ldots, (x_{ZIP}[n], y_{ZIP}[n])\}$. Thus, the likelihood $$p(x, y \mid \alpha_1, \alpha_2, \tau) \propto \prod_{t=1}^{n} \exp[(y_{ZIP}[t] - \mu[t])^2 \tau / 2], \quad (5)$$

where $\mu[t] \triangleq \alpha_1 x[t]^2 + \alpha_2 x[t] + \alpha_3$ is the mean.

B. IM Model

The parameters to be identified in an IM model are $X_r$, $X_m$, $X_s$, $R_r$, $R_s$, A, B, C, H. Typically, A is assumed to be 1 as the mechanical torque is assumed to be proportional to the square of the rotation speed of the motor. Consequently B and C are both equal to 0. For simplicity, define $y_{E_d} \triangleq dE_q/dt$, $y_{E_q} \triangleq dE_d/dt$, $y_\omega \triangleq d\omega/dt$, $y_{I_d} \triangleq I_d$, $y_{I_q} \triangleq I_q$, $\beta_1 \triangleq 1/T'$, $\beta_2 \triangleq -(X-X')/T'$, $\beta_3 \triangleq -\frac{1}{2}H$, $\alpha_b \triangleq R_s/R_s^2+X^2$, $\alpha_c \triangleq X'/R_s^2+X^2$. Assuming that the measurement noise is i.i.d. and follows a normal distribution, the IM model can be expressed as follows:

$$\begin{cases} y_{E_d}[t] = \beta_1 E_d'[t] + \beta_2 I_q[t] - (\omega - 1)E_q'[t] + \varepsilon_{E_d}[t] \\ y_{E_q}[t] = \beta_1 E_q'[t] - \beta_2 I_d[t] + (\omega - 1)E_d'[t] + \varepsilon_{E_q}[t] \\ y_\omega[t] = \beta_3(\omega^2 - E_d'[t]I_d[t] - E_q'[t]I_q[t]) + \varepsilon_\omega[t] \end{cases} \quad (6)$$

$$\begin{cases} y_{I_d}[t] = \alpha_b(U_d[t] - E_d'[t]) + \alpha_c(U_q[t] - E_q'[t]) + \varepsilon_{I_d}[t] \\ y_{I_q}[t] = \alpha_b(U_q[t] - E_q'[t]) + \alpha_c(U_d[t] - E_d'[t]) + \varepsilon_{I_q}[t] \end{cases}$$

where $\varepsilon_{E_d}[t]$, $\varepsilon_{E_q}[t]$, $\varepsilon_\omega[t]$, $\varepsilon_{I_d}[t]$, $\varepsilon_{I_q}[t]$ are all normal distributions with mean equals 0, variance equals $1/\tau_{E_d}$, $1/\tau_{E_q}$, $1/\tau_\omega$, $1/\tau_I$, $1/\tau_I$, respectively. The detailed simulation results with different measurement error will be introduced in the Case Studies section below to illustrate the robustness of the instant method.

For a composite model with ZIP+IM model, the total active power and reactive power can be respectively computed as:

$$\begin{cases} P = \lambda_p P_{ZIP} + (1-\lambda_p) P_{IM} \\ Q = \lambda_q Q_{ZIP} + (1-\lambda_q) Q_{IM} \end{cases} \quad (5)$$

where $\lambda_p + \lambda_q = 1$. Since the available data can be used for identification of aforementioned parameters is limited by the fact that the composite model proposed in FIG. 1 is an equivalent model, some of the parameters are not able to be direct measured, such as $E_d$, $E_q$, $\omega$, etc. Thus, it is challenging to identify all the parameters only use P, r, Q, and U, especially for parameters in equation (2). Therefore, in literature such problems were considered as optimization problems. Typical values of some parameters, e.g. $R_s$, $X_m$, $X_r$, were selected to help solving the differential equations in (2), and the calculated values ($E_d$, $E_q$, $\omega$) will be substituted into the constraints, for instance, in (5), to solve optimization problems. If (5) is smaller than the predefined threshold value, the identification procedure will be terminated. Otherwise, a new typical value will be selected to follow the same steps until the threshold is met.

$$[(-^\wedge)^2 + (-^\wedge)^2]$$

Figure 2:
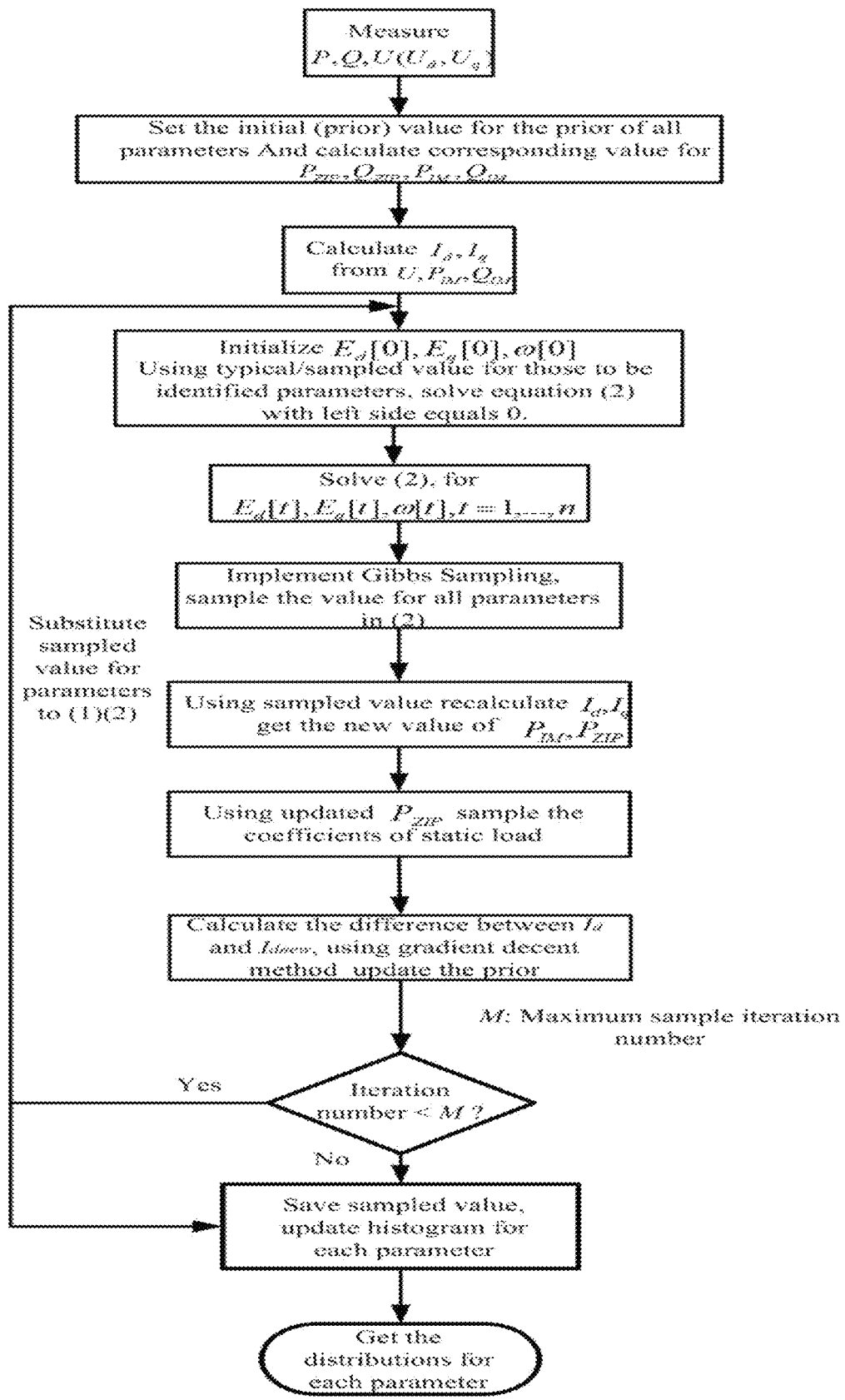
FIG. 2 shows a flowchart of an exemplary algorithm.

In one embodiment, a BE based method is used without optimizing the error between the measured value and the estimated value. The algorithm in FIG. 2 is inspired by the traditional method of: selecting typical values to solve the differential equations in (2) as well as using priors to calculate power consumed ZIP load. The results of calculated $E_d$, $E_q$, $\omega$) are used in GS to sample the parameters in 2. The sampled values are used to calculate the updated value of PIM by using 6, and PZIP by using 1, which will be used in next iteration as the updated values of the parameters. The detailed steps of this algorithm can be found in FIG. 2.

Gibbs sampling is an extension of Monte Carlo Markov Chain method, which performs well when there are multiple parameters to identify. The detailed sampling algorithm is shown in Algorithm 1.

---
Algorithm 1 Gibbs Sampling

Draw initial samples $\theta^{(0)} \sim q(\theta)$, where $q(\theta)$ is the prior
For iteration i = 1,2, ... , M do
 Calculate p $(\theta_1|\theta_2^{(i-1)}, \theta_3^{(i-1)}, ... , \theta_n^{(i-1)})$ and
 sample $\theta_1^{(i)} \sim p(\theta_1|\theta_2^{(i-1)}, \theta_3^{(i-1)}, ... , \theta_n^{(i-1)})$
 Calculate p $(\theta_2|\theta_1^{(i)}, \theta_3^{(i-1)}, ... , \theta_n^{(i-1)})$ and
 sample $\theta_2^{(i)} \sim p(\theta_2|\theta_1^{(i)}, \theta_3^{(i-1)}, ... , \theta_n^{(i-1)})$
 Calculate p $(\theta_n|\theta_1^{(i)}, \theta_3^{(i)}, ... , \theta_{n-1}^{(i)})$ and
 Sample $\theta_n^{(i)} \sim p(\theta_n|\theta_1^{(i)}, \theta_3^{(i)}, ... , \theta_{n-1}^{(i)})$
End for
The distribution estimate is the histogram of $\theta^i$, i = m, ... , M. Others are burn-in data and discarded
---

Starting with priors, Gibbs sampling estimates the posterior of one parameter while fixing others' values as samples from previous estimated posteriors. This process repeats for all parameters in one iteration.

C. Gibbs in ZIP Model
Start with the prior guess as follows:

$$\alpha_1 \sim \mathcal{N}(\mu_1^{(0)}, 1/\tau_1^{(0)}) \quad (7)$$

$$\alpha_2 \sim \mathcal{N}(\mu_2^{(0)}, 1/\tau_2^{(0)}) \quad (8)$$

$$\alpha_3 \sim \mathcal{N}(\mu_3^{(0)}, 1/\tau_3^{(0)}) \quad (9)$$

$$\tau \sim \mathcal{G}(a^{(0)}, b^{(0)}) \quad (10)$$

where the distribution of $\tau$ is a gamma distribution follows $\mathcal{G}(a, b)$. It can be shown that after each iteration of Gibbs sampling, the post distributions of these three parameters remains the same form. Only the first iteration will be shown here as an example. First, samples are drawn from the prior and $\alpha_1^{(0)}$, $\alpha_2^{(0)}$, $\alpha_3^{(0)}$, $\tau^{(0)}$ are initialized. After some algebraic yields:

$$p(\alpha_1|\alpha_2^{(0)}, \alpha_3^{(0)}, \tau^{(0)}, x, y) \propto p(x, y|\alpha_1, \alpha_2^{(0)}, \alpha_3^{(0)}, \tau^{(0)}) p(\alpha_1) \quad (11)$$

where $p(\alpha_1|\alpha_2^{(0)}, \tau^{(0)}, x, y)$ is the posterior probability given the samples of x, y, $\alpha_2$, and $\tau$, $p(x, y|\alpha_1, \alpha_2^{(0)}, \tau^{(0)})$ is the likelihood in (3), and $p(\alpha_1)$ is the prior estimation following (7). Taking the log form on both sides of (11) yields $$\log p(\alpha_1 | \alpha_2^{(0)}, \alpha_3^{(0)}, \tau^{(0)}, x, y) \propto \quad (12)$$
$$-\frac{\tau_1^{(0)}}{2}(\alpha_1 - \mu_1^{(0)})^2 - \frac{\tau^{(0)}}{2} \sum_{t=1}^n \left(y[t] - (\alpha_1 x[t]^2 + \alpha_2^{(0)} x[t] + \alpha_3^{(0)})\right)^2$$

Taking log form helps convert the multiplications of the probabilities to summations, which can significantly simplify calculations when updating the distributions of the posteriors. For a normal distribution $y \sim \mathcal{N}(\mu, 1/\tau)$, the log dependence on y is $$-\frac{\tau}{2}(y-\mu)^2 \propto -\frac{\tau}{2} y^2 + \tau\mu y$$

The right-hand side of equation (12) can be further written as the following if the terms not related to $\alpha_1$ are omitted.

$$-\left(\tau_1^{(0)} + \tau^{(0)} \sum_{t=1}^n (x[t]^2 - 1)^2\right) \alpha_1^2 / 2 + \quad (13)$$
$$\left(\tau_1^{(0)} \mu_1^{(0)} - \tau^{(0)} \sum_{t=1}^n (\alpha_3^{(0)}(y[t]-1)x[t]^2 - \alpha_2^{(0)} x[t]^3)\right) \alpha_1$$

$$\text{Define } \mu_1^{(1)} \triangleq \frac{\tau_1^{(0)} \mu_1^{(0)} - \tau^{(0)} \sum_{t=1}^n \left((\alpha_3^{(0)}(y[t]-1)x[t]^2 - \alpha_2^{(0)} x[t]^3)\right)}{\tau_1^{(0)} + \tau^{(0)} \sum_{t=1}^n (x[t]^2 - 1)^2},$$

$$\text{and } \tau_1^{(1)} \triangleq \tau_1^{(0)} + \tau^{(0)} \sum_{t=1}^n (x[t]^2 - 1)^2, \text{ yields}$$

$$\alpha_1 | \alpha_2^{(0)}, \alpha_3^{(0)}, \tau^{(0)}, \mu_1^{(0)}, \tau_1^{(0)}, x, y \sim \mathcal{N}(\mu_1^{(1)}, 1/\tau_1^{(1)})$$

Then sample a new $\alpha_1$ from the estimated distribution $\mathcal{N}(\mu_1^{(1)}, \tau_1^{(1)})$ as $\alpha_1^{(1)}$. Following the similar procedures $\alpha_2$ and $\alpha_3$ can be derived. Define $$\mu_2^{(1)} \triangleq \frac{\tau_2^{(0)} \mu_2^{(0)} - \tau^{(0)} \sum_{t=1}^n ((\alpha_3^{(0)}(y[t]-1)x[t] - \alpha_1^{(1)} x[t]^3))}{\tau_2^{(0)} + \tau^{(0)} \sum_{t=1}^n (x[t]-1)^2}$$

and $\tau_2^{(1)} \triangleq \tau_2^{(0)} + \tau^{(0)} \Sigma_{t=1}^{n} (x[t]-1)^2$. Therefore, the following can be derived: $\alpha_2 | \alpha_1^{(1)}, \alpha_2^{(0)}, \tau^{(0)}, \tau_2^{(0)}, \mu_2^{(0)}, x, y \sim \mathcal{N}(\mu_2^{(1)}, 1/\tau_2^{(1)})$ Define $$\mu_3^{(1)} \triangleq \frac{\tau_3^{(0)} \mu_3^{(0)} - \tau^{(0)} \Sigma_{t=1}^{n}(y[t] - \alpha_1^{(1)} x[t]^2 - \alpha_2^{(1)} x[t])}{\tau_3^{(0)} + \tau^{(0)} \Sigma_{t=1}^{n} (x[t]-1)^2} \text{ and}$$

$$\tau_3^{(1)} \triangleq \tau_3^{(0)} + \tau^{(0)} \sum_{t=1}^{n} (x[t]-1)^2.$$

Therefore, the following can be derived:

$\alpha_3 | \alpha_1^{(1)}, \alpha_2^{(1)}, \tau^{(0)}, \tau_3^{(0)}, \mu_4^{(0)}, x, y \sim \mathcal{N}(\mu_3^{(1)}, 1/\tau_3^{(1)})$.

For $\tau$, the posterior given new samples of $\alpha_1^{(1)}$, and $\alpha_2^{(1)}$ can be written as $p(\tau|\alpha_1^{(1)}, \alpha_2^{(1)}, x, y) \propto p(x, y | \alpha_1^{(1)}, \alpha_2^{(1)}, \tau) p(\tau)$. Taking the log form of both sides of the posterior and yields $$\log p(\tau \mid \alpha_1^{(1)}, \alpha_2^{(1)}, x, y) \propto$$

$$\frac{n}{2} \log \tau - \frac{\tau}{2} \sum_{t=1}^{n} (y[t] - \alpha_1^{(1)} x[t]^2 - \alpha_2^{(1)} x[t] - \alpha_3^{(1)} + (a^{(0)} - 1) \log \tau - b^{(0)} \tau).$$

Define $a^{(1)} = a^{(0)} + n/2$, $b^{(1)} = {}^{(0)} + \Sigma_{t=1}^{n}(y[t] - \alpha_1^{(1)} x[t]^2 - \alpha_2^{(1)} x[t] - \alpha_3^{(1)})^2/2$. The posterior $\tau|\alpha_1^{(1)}, \alpha_2^{(1)}, x, y, \sim \mathcal{G}(a^{(1)}, b^{(1)})$ can be obtained.

D. Gibbs in IM Models

GS in IM model will follow the same steps as that in ZIP model. Start with the priors as follows.

$\beta_1 \sim \mathcal{N}(\mu_{\beta_1}^{(0)}, 1/\tau_{\beta_1}^{(0)}), \beta_2 \sim \mathcal{N}(\mu_{\beta_2}^{(0)}, 1/\tau_{\beta_2}^{(0)}),$ $\beta_3 \sim \mathcal{N}(\mu_{\beta_3}^{(0)}, 1/\tau_{\beta_3}^{(0)}), \alpha_b \sim \mathcal{N}(\mu_{\alpha_b}^{(0)}, 1/\tau_{\alpha_b}^{(0)})$ $\alpha_c \sim \mathcal{N}(\mu_{\alpha_c}^{(0)}, 1/\tau_{\alpha_c}^{(0)}), \tau_E \sim \mathcal{G}(a_E^{(0)}, b_E^{(0)})$ $\tau_\omega \sim \mathcal{G}(a_\omega^{(0)}, b_\omega^{(0)}), \tau_I \sim \mathcal{G}(a_I^{(0)}, b_I^{(0)}).$ Given the measurement of $y_{E_d}, y_{E_q}, y_\omega, E_q, E_d, I_d, I_q, U_d, U_q$, Gibbs sampling of the IM model is stated as follows. Define $$\mu_{\beta_1}^{(k+1)} = \frac{\tau_{\beta_1}^{(k)} \mu_{\beta_1}^{(k)} + \tau_E^{(k)} \sum_{t=1}^{n} \left( E'_d[t] y_{E_d}[t] + E'_q[t] y_{E_q}[t] - \beta_2^{(k)}(E'_d[t] I_q[t] - E'_q[t] I_d[t]) \right)}{\tau_{\beta_1}^{(k)} + \tau_E^{(k)} \sum_{t=1}^{n} (E'_d[t]^2 + E'_q[t]^2)},$$

$$\tau_{\beta_1}^{(k+1)} = \frac{1}{\tau_{\beta_1}^{(k)} + \tau_E^{(k)} \sum_{t=1}^{n} (E'_d[t]^2 + E'_q[t]^2)}.$$

We have, $\beta_1|\beta_2^{(k)}, y_{E_d}, y_{E_q}, E_d, E_q, U_d, U_q, I_q, I_d, \omega, \tau_E^{(k)}, \tau_{\beta_1}^{(k)}, \mu_{\beta_1}^{(k)} \sim \mathcal{N}(\mu_{\beta_1}^{(k+1)}, \tau_{\beta_1}^{(k+1)})$ Define:

$$\mu_{\beta_2}^{(k+1)} = \left[ \tau_{\beta_2}^{(k)} \mu_{\beta_2}^{(k)} + \tau_E^{(k)} \sum_{t=1}^{n} \left( y_{E_d}[t] I_q[t] - y_{E_q}[t] I_d[t] + \beta_1^{(k+1)}(E'_d[t] I_q[t] - E'_q[t] I_d[t]) + (\omega[t] - 1)(E'_d[t] I_d[t] + E_q[t] I_q[t]) \right) \right] / \left[ \tau_{\beta_2}^{(k)} + \right.$$

$$\left. \tau_E^{(k)} \sum_{t=1}^{n} (I_d[t]^2 + I_q[t]^2) \right],$$

$$\tau_{\beta_2}^{(k+1)} = \frac{1}{\tau_{\beta_2}^{(k)} + \tau_E^{(k)} \sum_{t=1}^{n} (I_d[t]^2 + I_q[t]^2)},$$

We have $\beta_2|\beta_1^{(k+1)}, y_{E_d}, y_{E_q}, E_d, E_q, U_d, U_q, I_d, I_q, \omega, \tau_E^{(k)}, \tau_{\beta_2}^{(k)}, \mu_{\beta_2}^{(k)} \sim \mathcal{N}(\mu_{\beta_2}^{(k+1)}, \tau_{\beta_2}^{(k+1)})$
Define $$\mu_{\beta_3}^{(k+1)} = \left[ \tau_{\beta_3}^{(k)} \mu_{\beta_3}^{(k)} - \tau_\omega^{(k)} \sum_{t=1}^{n} (y_\omega[t](-\omega[t]^2 T_0 + E'_d[t] I_d[t] + E_q[t] I_q[t])) \right] \left[ \tau_{\beta_3}^{(k)} + \right.$$

$$\left. \tau_\omega^{(k)} \sum_{t=1}^{n} (\omega[t]^4 T_0^2 + (E'_d[t] I_d[t] + E_q[t] I_q[t])^2 - \right.$$

$$\left. 2\omega[t]^2 T_0 (E'_d[t] I_d[t] + E_q[t] I_q[t])) \right],$$

$$\mu_{\beta_3}^{(k+1)} = 1 / \left[ \tau_{\beta_3}^{(k)} + \tau_\omega^{(k)} \sum_{t=1}^{n} (\omega[t]^4 T_0^2 + (E'_d[t] I_d[t] + E_q[t] I_q[t])^2 - \right.$$

$$\left. 2\omega[t]^2 T_0 (E'_d[t] I_d[t] + E_q[t] I_q[t])) \right],$$

We have, $\beta_3|E_d, E_q, U_d, U_q, I_d, I_q, \omega, \tau_E^{(k)}, \tau_{\beta_3}^{(k)}, \mu_{\beta_3}^{(k)} \sim \mathcal{N}(\mu_{\beta_3}^{(k+1)}, \tau_{\beta_3}^{(k+1)})$
Define $$\mu_{\alpha_b}^{(k+1)} = \frac{\tau_{\alpha_b}^{(k)} \mu_{\alpha_b}^{(k)} + \tau_I^{(k)} \sum_{t=1}^{n} (I_d[t](U_d[t] - E'_d[t]) + I_q[t](U_q[t] - E'_q[t]))}{\tau_{\alpha_b}^{(k)} + \tau_I^{(k)} \sum_{t=1}^{n} ((U_d[t] - E_d[t])^2 + (U_q[t] - E_q[t])^2)},$$

$$\tau_{\alpha_b}^{(k+1)} = \frac{1}{\tau_{\alpha_b}^{(k)} + \tau_I^{(k)} \sum_{t=1}^{n} ((U_d[t] - E_d[t])^2 + (U_q[t] - E_q[t])^2)}$$

We have, $\alpha_b|E_d, E_q, U_d, U_q, I_d, I_q, \omega, \tau_I^{(k)}, \tau_{\alpha_b}^{(k)}, \mu_{\alpha_b}^{(k)} \sim \mathcal{N}(\mu_{\alpha_b}^{(k+1)}, \tau_{\alpha_b}^{(k+1)})$
Define $$\mu_{\alpha_c}^{(k+1)} = \frac{\tau_{\alpha_c}^{(k)} \mu_{\alpha_c}^{(k)} + \tau_I^{(k)} \sum_{t=1}^{n} (I_d[t](U_d[t] - E'_d[t]) - I_q[t](U_q[t] - E'_q[t]))}{\tau_{\alpha_c}^{(k)} + \tau_I^{(k)} \sum_{t=1}^{n} ((U_d[t] - E_d[t])^2 + (U_q[t] - E_q[t])^2)},$$

$$\tau_{\alpha_c}^{(k+1)} = \frac{1}{\tau_{\alpha_c}^{(k)} + \tau_I^{(k)} \sum_{t=1}^{n} ((U_d[t] - E_d[t])^2 + (U_q[t] - E_q[t])^2)}$$

We have, $\alpha_c|E_d, E_q, U_d, U_q, I_d, I_q, \omega, \tau_I^{(k)}, \tau_{\alpha_c}^{(k)}, \mu_{\alpha_c}^{(k)} \sim \mathcal{N}(\mu_{\alpha_c}^{(k+1)}, \tau_{\alpha_c}^{(k+1)})$
Define $$a_E^{(k+1)} = a_E^{(k)} + n/2,$$

$$b_E^{(k+1)} = b_E^{(k)} + \sum_{t=1}^{n} \left[ \left( y_{E_d}[t] - \beta_1^{(k+1)} E'_q[t] - \beta_2^{(k+1)} I_d[t] + (\omega[t] - 1) E'_q[t] \right)^2 + \left( y_{E_q}[t] - \beta_1^{(k+1)} E'_d[t] + \beta_2^{(k+1)} I_q[t] - (\omega[t] - 1) E'_d[t] \right)^2 \right] / 2$$

We have, $\tau_E^{(k+1)}|I_d, I_q, y_{E_d}, y_{E_q}, E_d, E_q, \omega, \beta_1^{(k+1)}, \beta_2^{(k+1)} \sim \mathcal{G}(a_E^{(k+1)}, b_E^{(k+1)})$ Define $$a_\omega^{(k+1)} = a_\omega^{(k)} + n/2,$$

$$b_\omega^{(k+1)} = b_\omega^{(k)} + \frac{1}{2}\sum_{t=1}^{n}[y_\omega[t] - \beta_3^{(k+1)}(\omega[t])^2 T_0 - E'_d[t]I_d[t] - E'_q[t]I_q[t])]^2,$$

We have, $\tau_\omega^{(k+1)}|I_d, I_q, E_d, E_q, y_\omega, \omega, U_d, U_q, \beta_3^{(k+1)} \sim \mathcal{G}(a_\omega^{(k+1)}, b_\omega^{(k+1)})$ Define $$a_I^{(k+1)} = a_I^{(k)} + n/2,$$

$$b_I^{(k+1)} = b_I^{(k)} + \sum_{t=1}^{n}\left[(I_d[t] - \alpha_b^{(k+1)}(U_d[t] - E'_d[t]) - \alpha_c^{(k+1)}(U_q[t] - E'_q[t]))^2 + (I_q[t] - \alpha_b^{(k+1)}(U_q[t] - E'_q[t]) + \alpha_c^{(k+1)}(U_d[t] - E'_d[t])\backslash big)^2\right]/2,$$

We have, $\tau_I^{(k+1)}|E_d, E_q, U_d, U_q, I_d, I_q, \alpha_b^{(k+1)}, \alpha_c^{(k+1)} \sim \mathcal{G}(a_I^{(k+1)}, b_I^{(k+1)})$

E. Updates of the Prior

Gradient descent is a first-order iterative optimization algorithm for finding the minimum of a function. To find a local minimum of a function using gradient descent, one takes steps proportional to the negative of the gradient (or approximate gradient) of the function at the current point. In one embodiment, ADAM method is used for parameter updating as stated in Algorithm 2.

---

Algorithm2 For a slightly more efficient (but less clear) order of computation. $g_t^2$ indicates the elementwise square $g_t \odot g_t$. Good default settings for the tested machine learning problems are $s = 0.001$, $\beta_1 = 0.9$, $\beta_2 = 0.999$ and $\epsilon = 10^{-8}$. All operations on vectors are element-wise. With $\beta_1^t$ and $\beta_2^t$ we denote $\beta_1$ and $\beta_2$ to the power t.

---

Require: $\Delta$: Step size
Require: $\beta_1, \beta_2 \in [0, 1)$: Exponential decay rates for the moment estimates
Require: $f(\theta)$ Stochastic objective function with parameters $\theta$
Require: $\theta_0$: Initial parameter vector
 $m_0 \leftarrow 0$ (Initialize 1st moment vector)
 $v_0 \leftarrow 0$ (Initialize 2nd moment vector)
 $t \leftarrow 0$ (Initialize timestep)
 while $\theta_t$ not converged do
  $t \leftarrow t + 1$
  $g_t \leftarrow \nabla_\theta f_t(\theta_{t-1})$ (Get gradients w.r.t. stochastic objective at timestep t)
  $m_t \leftarrow \beta_1 \cdot m_{t-1} + (1 - \beta_1) \cdot g_t$ (Update biased first moment estimate)
  $v_t \leftarrow \beta_2 \cdot v_{t-1} + (1 - \beta_2) \cdot g_t^2$ (Update biased second raw moment estimate)
  $\hat{m}_t \leftarrow m_t/(1 - \beta_1^t)$ (Compute bias-corrected first moment estimate)
  $\hat{v}_t \leftarrow v_t/(1 - \beta_2^t)$ (Compute bias-corrected second raw moment estimate)
  $\theta_t \leftarrow \theta_{t-1} - \Delta \cdot \hat{m}_t/(\sqrt{\hat{v}_t} + \epsilon)$ (Update parameters)
 end while
 return (Resulting parameters)

---

II. Case Studies

Simulation studies are carried out in this section for composite models with ZIP+IM considering measurement errors and outliers. Benchmark test using least square and genetic algorithm methods are also proposed. Only active power is shown as an example, the reactive power will follow the same steps. In GS, the length of burn-in process m is chosen as 5000.

A. Composite Model Parameters Identification

Figure 3:
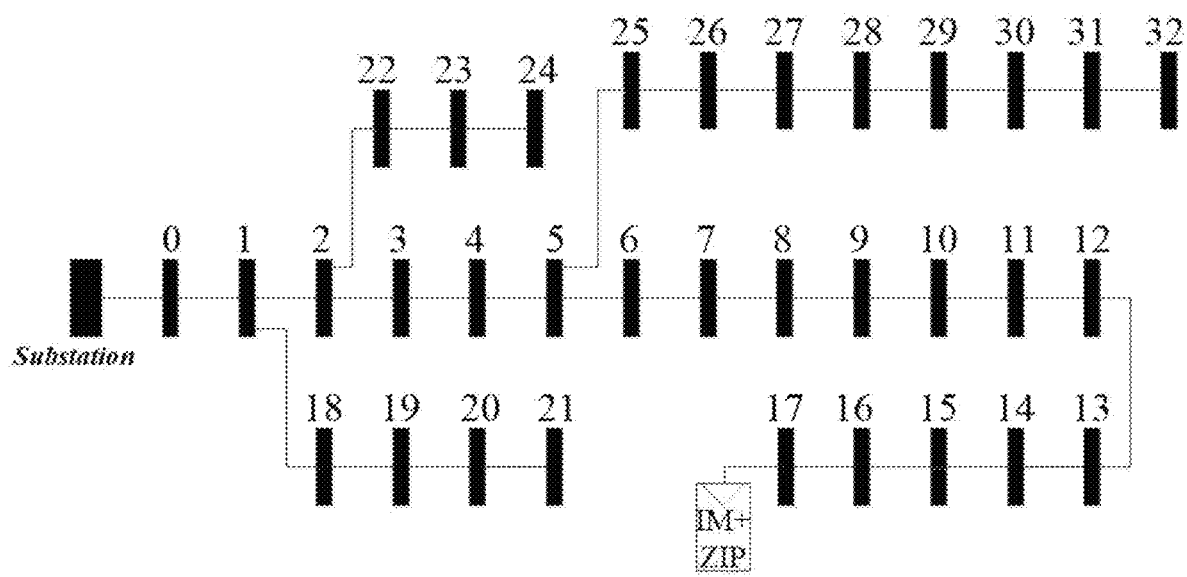
FIG. 3 illustrates the estimated parameters of the ZIP model.
Figure 4:
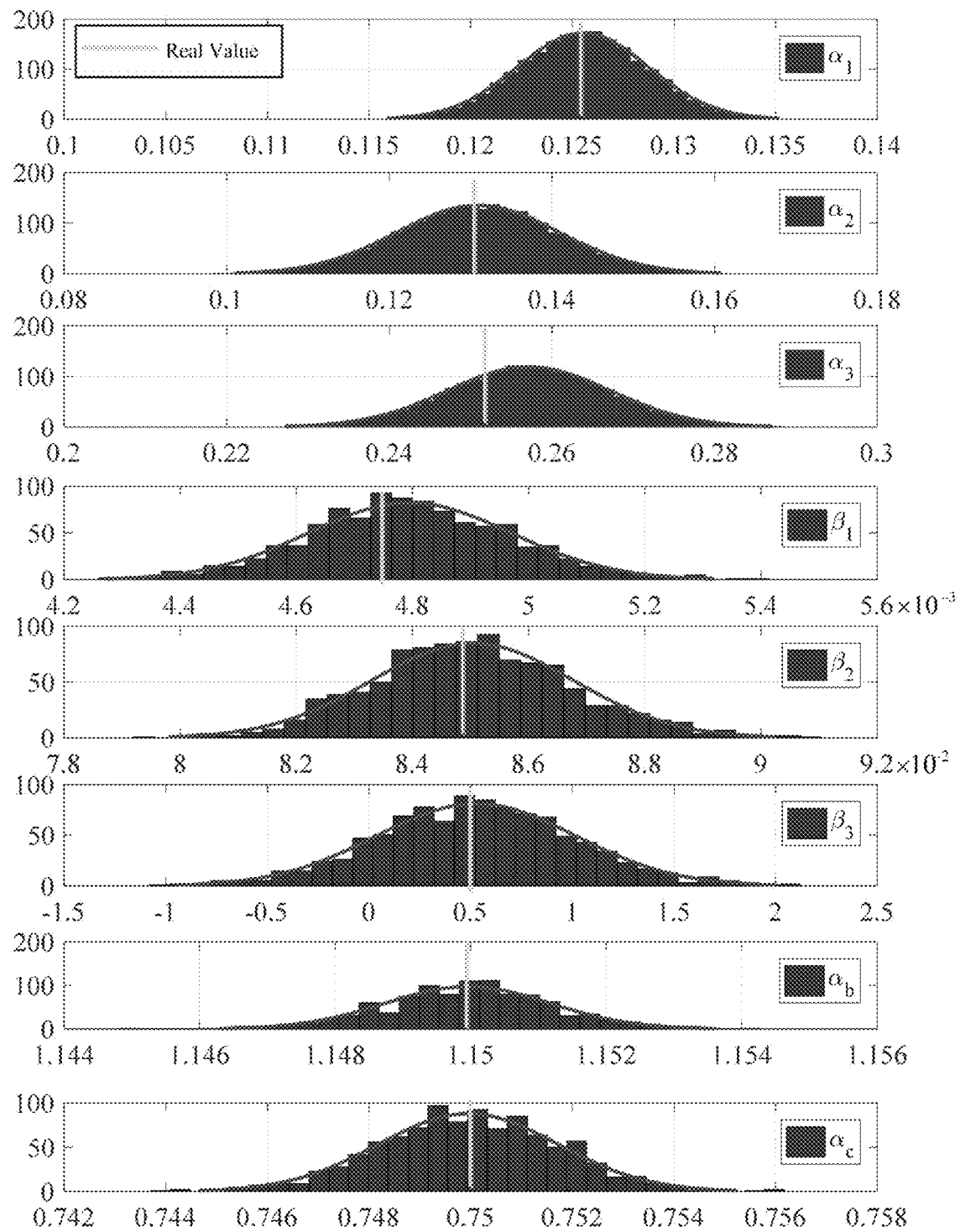
FIG. 4 shows the estimated parameters of the ZIP model.
Figure 5:
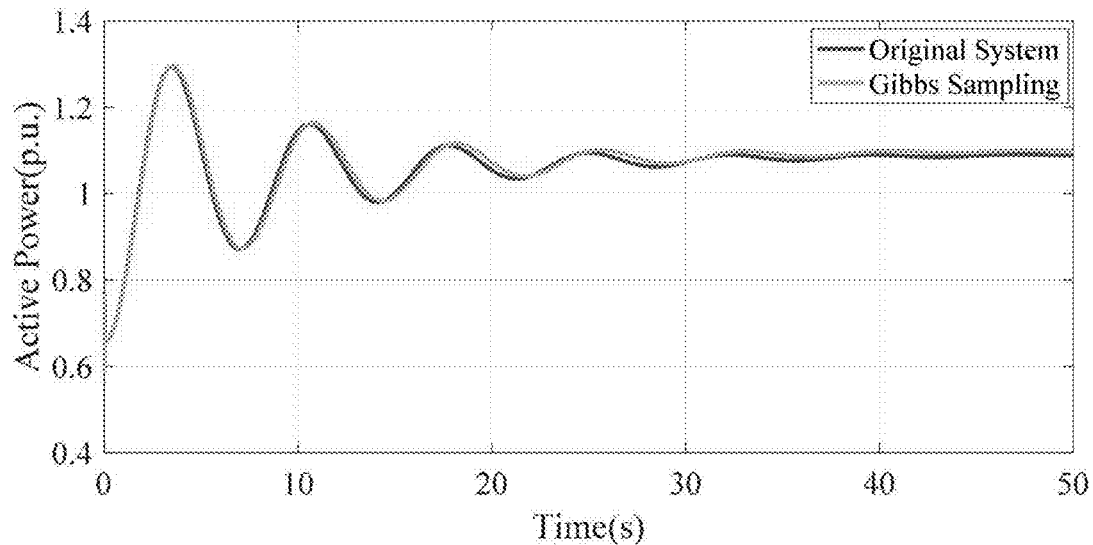
FIG. 5 illustrates the comparison of system active response between the original system and the estimated system.

The 33-bus test feeder, as shown in FIG. 3, is simulated to generate the testing data. Load at bus 18 is connected by a ZIP+IM model as an example. The ZIP factors of the load at node 18 were assigned as $\alpha_1 = 0.25$, $\alpha_2 = 0.25$, $\alpha_3 = 0.5$ with $\lambda_p = 0.5$. Therefore, the expected values of the parameters are all scaled $\lambda$. By implementing the proposed GS method, the coefficients for ZIP model and IM model are estimated as shown in FIG. 4. The discrete distributions for each parameter can be derived by implementing the instant method. Distributions describe the probabilities of different values falling into different ranges. In this study, the mean value is selected as the estimated value of each parameter as shown in FIG. 9. The estimation error for each parameter compared with the real values are also included in FIG. 9. According to FIG. 9, the estimation errors are less than 6% with 0 measurement error. In most cases, the error is even smaller. The active power response by using the identified parameters is shown in FIG. 5. Comparing with the original active response, only tiny difference can be observed. It is worth to mention that the estimation of parameters highly relies on the prior distributions. A good prior can significantly increase the estimation accuracy and shorten the burn-in period.

GS is able to handle certain measurement error and anomalies. In FIG. 10, the estimated values by considering 10% measurement error and measurement anomalies by using the proposed method are presented. The measurement anomalies are simulated by replacing the results of 2500 measurements by 0 (both active power and voltage) among total 250,000 readings, which can be considered as 1% measurement anomaly. The results shown in FIG. 10 indicate the identifications are influenced by the error and anomalies, but the accuracy is still within an acceptable range.

B. Comparison with Benchmarks

Figure 6:
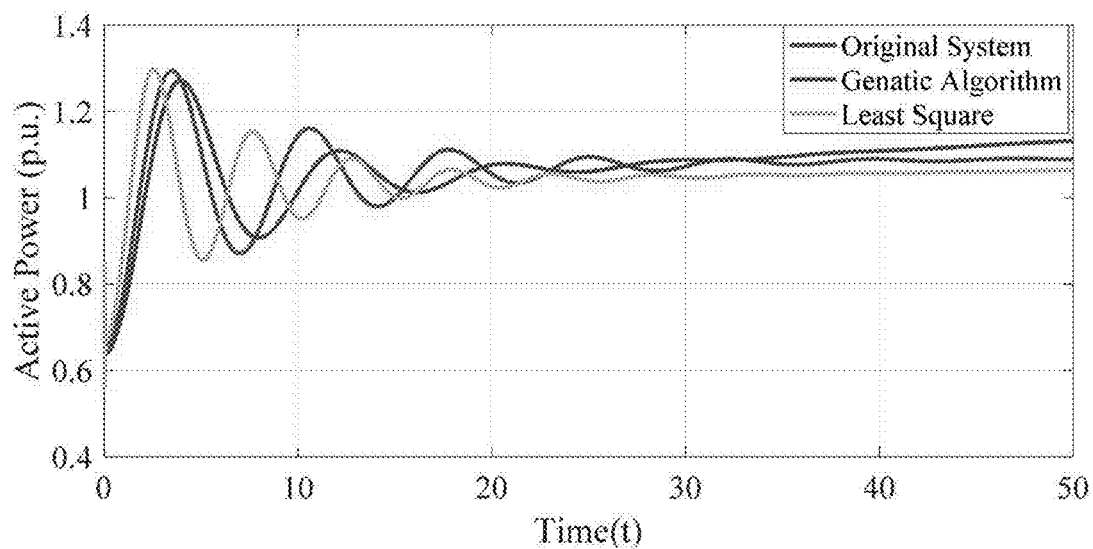
FIG. 6 shows the active power response comparison by using LS and GA.
Figure 7:
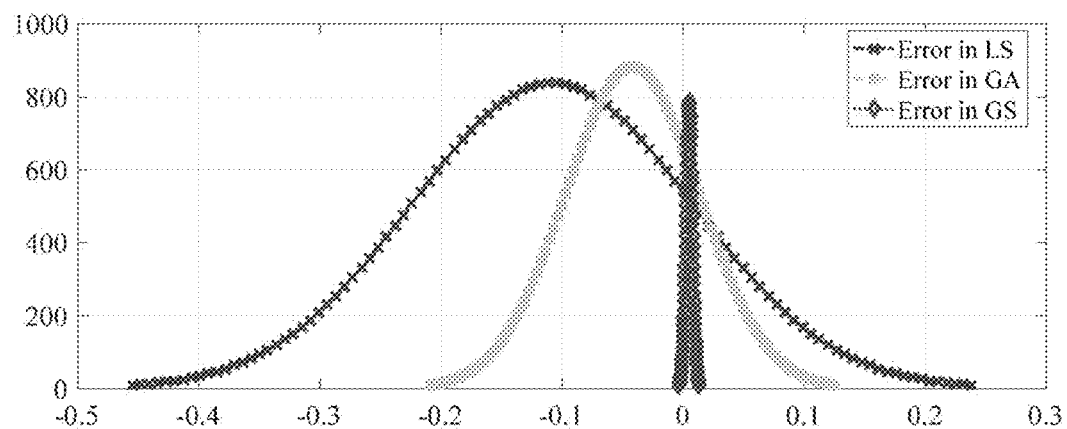
FIG. 7 shows the error of active power using GS, GA, LS with 10% measurement error.
Figure 8:
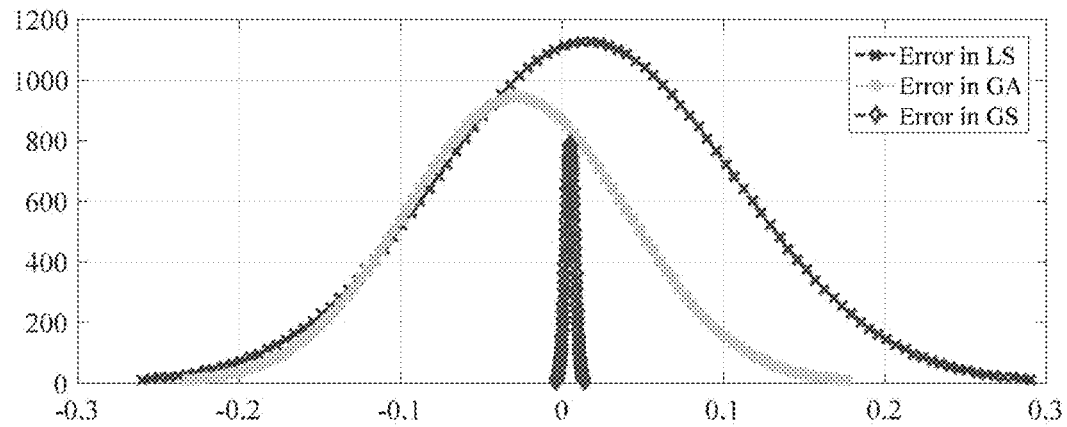
FIG. 8 shows the error of active power using GS, GA, LS with measurement anomalies.

The ZIP and IM model parameters derived by the proposed GS method are compared against least square (LS) and Genetic Algorithm (GA) methods. The "lsqcurvefit" and "ga" function in Matlab was used to derive the coefficients in LS and GA, respectively. Parameters identified by three different approaches are listed in FIG. 11. Comparisons of the active power responses using parameters identified by LS, and GA techniques are presented in FIG. 6. According to FIGS. 6 and 10, it is obvious that GS approach has the best performance, while GA and LS methods larger error than GS method. The scenarios with measurement errors and anomalies are also considered in LS and GA approaches. Same measurement error and anomaly is used, and the comparisons are shown in FIGS. 12 and 13, respectively. The system responses using the aforementioned parameters by GS, LS, GA approaches with 10% measurement error and 1% measurement anomaly are shown in FIGS. 7 and 8, respectively. It can be shown that under the same circumstance, GS method is able to provide the best estimation, while LS and GA methods are significantly impacted by measurement error and anomalies.

With the integration of renewable resources, electrical vehicles and other uncertain resources into power system, the accuracy of the instant load model plays an important role in simulation, prediction, as well as stability and reliability analysis. The statistic (Bayesian Estimation) based distribution estimation approach generates composite load models, including static (ZIP) and dynamic (Induction Motor) parts, by implementing Gibbs sampling. The system provides a distribution estimation of load models coefficients and is robust to measurement errors.

What is claimed is:

1. A method for managing a power load of a grid, comprising:
   performing a statistic-based distribution estimation of a composite load model using static and dynamic models with Gibbs sampling, wherein the load comprises resistive and inductive loads;
   deriving a distribution estimation of load model coefficients; and
   controlling grid power based on a simulation, a prediction, a stability analysis or a reliability analysis with the load model coefficients by applying the simulation, prediction, stability analysis or reliability analysis to control power of electrical loads having impedance, current or power provided to one or more resistive and inductive loads.

2. The method of claim 1, wherein the statistic-based estimation comprises a Bayesian estimation.

3. The method of claim 1, wherein the static model comprises a ZIP model.

4. The method of claim 3, wherein the ZIP model describes load power changes as a voltage varies in a steady-state condition.

5. The method of claim 3, wherein the ZIP model comprises:

$$P = P_0(\alpha_1 \bar{V}^2 + \alpha_2 \bar{V} + \alpha_3)$$
$$Q = Q_0(\alpha_4 \bar{V}^2 + \alpha_5 \bar{V} + \alpha_6)$$
$$\sum_{i=1}^{3} \alpha_i = \sum_{i=4}^{6} \alpha_i = 1$$
$$P = P_0(\alpha_1 \bar{V}^2 + \alpha_2 \bar{V} + \alpha_3)$$
$$Q = Q_0(\alpha_4 \bar{V}^2 + \alpha_5 \bar{V} + \alpha_6)$$
$$\sum_{i=1}^{3} \alpha_i = \sum_{i=4}^{6} \alpha_i = 1$$

where $\Sigma_{i=1}^{3}\alpha_i = \lambda_p$, $\Sigma_{i=4}^{6}\alpha_i = \lambda_q$, $\bar{V}=V/V_0$.

6. The method of claim 1, wherein the dynamic model comprises an induction motor (IM) model.

7. The method of claim 6, wherein the IM model can be expressed as follows:

$$\begin{cases} y_{E_d}[t] = \beta_1 E'_d[t] + \beta_2 I_q[t] - (\omega - 1)E'_q[t] + \varepsilon_{E_d}[t] \\ y_{E_q}[t] = \beta_1 E'_q[t] - \beta_2 I_d[t] + (\omega - 1)E'_d[t] + \varepsilon_{E_q}[t] \\ y_\omega[t] = \beta_3(\omega^2 - E'_d[t]I_d[t] - E'_q[t]I_q[t]) + \varepsilon_\omega[t] \end{cases}$$

$$\begin{cases} y_{I_d}[t] = \alpha_b(U_d[t] - E'_d[t]) + \alpha_c(U_q[t] - E'_q[t]) + \varepsilon_{I_d}[t] \\ y_{I_q}[t] = \alpha_b(U_q[t] - E'_q[t]) + \alpha_c(U_d[t] - E'_d[t]) + \varepsilon_{I_q}[t] \end{cases}$$

where $\varepsilon_{E_d}[t]$, $\varepsilon_{E_q}[t]$, $\varepsilon_\omega[t]$, $\varepsilon_{I_d}[t]$, $\varepsilon_{I_q}[t]$ are all normal distributions with mean equals 0, variance equals $1/\tau_E$, $1/\tau_E$, $1/\tau_\Omega$, $1/\tau_I$, $1/\tau_I$, respectively.

8. The method of claim 1, comprising determining:

$$\begin{cases} P_{ZIP} = P_{ZIP0}(\alpha_1 \bar{V}^2 + \alpha_2 \bar{V} + \alpha_3), \\ Q_{ZIP} = Q_{ZIP0}(\alpha_4 \bar{V}^2 + \alpha_5 \bar{V} + \alpha_6), \end{cases}$$

$$\begin{cases} \frac{dE'_d}{dt} = -\frac{1}{T'}[E'_d + (X - X')I_q] - (\omega - 1)E'_q \\ \frac{dE'_q}{dt} = -\frac{1}{T'}[E'_q - (X - X')I_d] + (\omega - 1)E'_d \\ \frac{d\omega}{dt} = -\frac{1}{2H}[(A\omega^2 + B\omega + C)T_0 - (E'_d I_d + E'_q I_q)] \end{cases}$$

$$\begin{cases} I_d = \frac{1}{(R_s^2 + X'^2)}[R_s(U_d - E'_d) + X'(U_q - E'_q)] \\ I_q = \frac{1}{(R_s^2 + X'^2)}[R_s(U_q - E'_q) - X'(U_d - (E')_d)] \end{cases}$$

where parameters $\alpha_1, \ldots \alpha_6$, $X_m$, $X_r$, $X_s$, $R_r$, A, B, C, H and wherein:

$$X' \triangleq X_s + X_m X_r/(X_m + X_r),$$

$$X \triangleq X_s + X_m,$$

$$T' \triangleq (X_r + X_m)/R_r.$$

9. The method of claim 1, comprising determining a prior.

10. The method of claim 9, comprising applying gradient descent (GD) to update the prior.

11. The method of claim 10, wherein the GD comprises applying an Adaptive Moment Estimation (Adam) to determine adaptive learning rates for each parameter.

12. The method of claim 1, comprising determining a total active power and reactive power as:

$$\begin{cases} P = \lambda_p P_{ZIP} + (1 - \lambda_p)P_{IM} \\ Q = \lambda_q Q_{ZIP} + (1 - \lambda_q)Q_{IM} \end{cases}$$

where $\lambda_p + \lambda_q = 1$.

13. The method of claim 1, comprising determining real power and reactive power of the load.

14. The method of claim 1, wherein a mean value is selected as an estimated value of each parameter.

15. The method of claim 1, comprising performing Gibbs sampling of the IM model.

16. The method of claim 15, comprising determining $\tau_I^{(k+1)}|E'_d, E'_q, U_d, U_q, I_d, I_q, \alpha_b^{(k+1)}, \alpha_c^{(k+1)} \sim G(\alpha_I^{(k+1)}, \beta_I^{(k+1)})$.

* * * * *